Sept. 14, 1926.  
W. WEILER  
1,600,026  
POWER TRANSMITTING SYSTEM  
Filed March 24, 1926
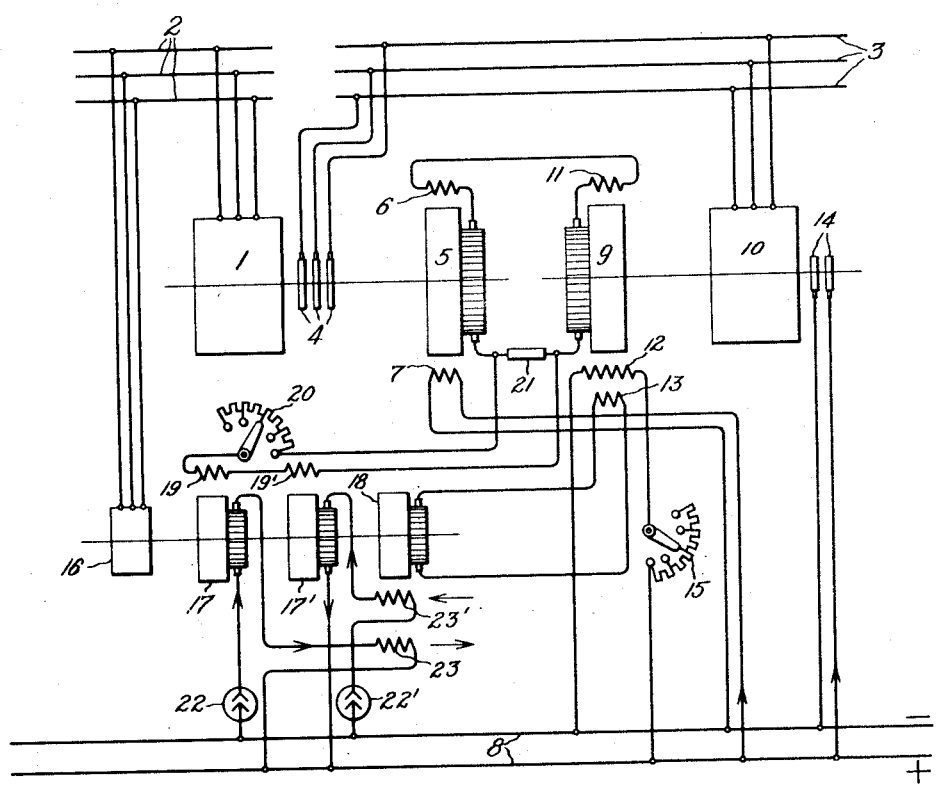
Inventor:  
Wilhelm Weiler,  
by Alexander F. [Smith],  
His Attorney.

Patented Sept. 14, 1926.

1,600,026

UNITED STATES PATENT OFFICE.

WILHELM WEILER, OF NIEDERSCHONHAUSEN, GERMANY, ASSIGNOR TO GENERAL ELECTRIC COMPANY, A CORPORATION OF NEW YORK.

POWER-TRANSMITTING SYSTEM.

Application filed March 24, 1926, Serial No. 97,123, and in Germany June 16, 1925.

My invention relates to power transmitting systems and in particular to frequency changers for interconnecting alternating current systems operated at different frequencies, and has for its object the provision of an improved arrangement for limiting the energy transmitted to a safe value without interfering with the ready interchange of energy between the different systems under normal operating conditions. More particularly my invention relates to improvements in the frequency changer system described in my copending application Serial No. 748,501, filed November 7, 1924.

For the purpose of explaining my invention, it will be described as utilized in connection with an induction frequency converter. It is well known that when an induction machine is driven after the manner of an ordinary induction motor, the energy supplied to the primary winding is divided into two parts, one of these parts being converted into mechanical energy by which the motor is rotated and the other part is conveyed to the secondary circuit by transformer action. When the primary and secondary circuits of the induction machines are connected to alternating current systems operated at different frequencies, this machine operates as a frequency converter to permit an interchange of power between the two systems. Under these conditions, the magnitude and direction of power transmission between the two systems is dependent upon the relation existing between the frequencies at which the systems are operated and the interchanged power may be limited in value by control of the torque exerted by or upon the shaft of the converter. Various arrangements have been proposed and used for varying the rotor speed of the converter in a manner to prevent excessive transfers of energy therethrough between the two systems. Many, if not all, of these arrangements have been constructed in such a manner as to hinder the free interchange of energy between the systems under normal operating conditions, thus interfering with the buffer action. In accordance with my invention, this difficulty is avoided by intentionally providing for a strong buffer action and arranging normally inactive means to limit the energy transmitted through the converter in either direction.

My invention will be better understood from the following description when considered in connection with the accompanying drawings and its scope will be pointed out in the appended claims.

The drawing shows a frequency converter 1 arranged to have its stator winding interconnected with a polyphase line 2 and to have its rotor winding connected to a polyphase line 3 through slip rings 4. A direct current machine 5, which comprises a series field winding 6 and a separately excited field winding 7 arranged to be supplied with current through the line 8 is mechanically coupled to the converter 1 and is connected in series opposition with a direct current machine 9. The machine 9 is coupled to a synchronous alternating current machine 10 and is provided with a series field winding 11 and with separately excited field windings 12 and 13. The stator winding of the machine 10 is arranged to be connected to the polyphase line 3 and its field winding is arranged to be supplied with current from the line 8 through slip rings 14.

The shunt field winding 12 of the machine 9 is arranged to be supplied with current through an adjustable resistor 15 which is provided for adjusting the direction and amount of energy transmitted between the two systems through the converter 1 under ordinary conditions. The field winding 13 is provided for the purpose of preventing an excessive transfer of energy in either direction through the converter 1 upon wide variations in frequency between the two systems 2 and 3 and is arranged to be supplied with current through a control aggregate comprising a motor 16 to which are coupled direct current generators 17, 17' and 18. The field windings 19 and 19' of the direct current generators 17 and 17' are arranged to be connected through an adjustable resistor 20 to the terminals of a shunt 21 which is connected in series between the direct current machines 5 and 9. With this connection there will therefore be supplied to the field windings 19 and 19' a current which is proportional in value to the magnitude of the current transmitted between the machines 5 and 9 and which changes in direction with the direction of power transfer. The armature winding of the generator 17 is connected through an asymmetric valve 22 and the field winding 23 of the generator 18 to the direct current line 8, the connection being so arranged that the voltage of the machine 17 is opposed to that of the line 8 when it is in a direction to cause current to flow through the valve 22. The armature winding of the generator 17' is likewise connected through an asymmetric valve 22' and the field winding 23' of the generator 18 to the direct current line 8, but in the reverse direction. The generated electromotive forces of the machines 17 and 17' are thus directly proportional in value to the current transmitted between the machines 5 and 9 and may be regulated in value by means of the resistor 20. With any given adjustment no current will be supplied to the field windings 23 and 23' of the machine 18 until the electromotive force of one of the machines 17 or 17' becomes greater than the voltage of the direct current line 8. Thus when the current in the field windings 19 and 19' exceeds a certain amount in one direction, namely that produced by a transfer of energy from machine 5 to machine 9, the voltage of machine 17 exceeds that of line 8 and current flows in field winding 23 in a direction to increase the resultant field excitation of machine 9 through the winding 13. At this time current is prevented from flowing in field winding 23' by the asymmetric valve 22'. When the current in field windings 19 and 19' exceeds a certain amount in the opposite direction, the voltage of machine 17' exceeds that of line 8 and current flows in field winding 23' to produce a reverse excitation so that the resultant excitation of machine 9 is reduced, while the asymmetric cell 22 prevents any flow of current in field winding 23. When either of these events occur, the field winding 13 of the machine 9 is energized and, as hereinafter explained, a restraining influence is brought to bear on the transmission of energy between the systems 2 and 3.

The direction of energy transmission between the machines 5 and 9 is dependent upon the energy transmission through the converter 1 between the polyphase systems represented by lines 2 and 3. The conditions under which no current will be transmitted between the machines 5 and 9 may be controlled by adjustment of the resistor 15 through which the voltage of the machine 9 is controlled. When the electromotive forces of the machines 5 and 9 are equal, the current transmitted between these machines will, of course, be nil. In initiating the operation of the apparatus the resistor 15 is so adjusted as to balance the electromotive forces of the machines 5 and 9 at such a value as to prevent the transmission of an excessive amount of energy between the lines 2 and 3 under abnormal conditions. This adjustment may be such that the transfer of energy is zero when the frequencies of the two alternating current systems are exactly correct.

Assuming that this adjustment has been made, the manner in which the transmission of excessive amounts of energy from the line 3 to the line 2 is prevented will be readily understood. Starting with a condition of no current transmission between the machines 5 and 9, predetermined as previously indicated, an increase in the operating frequency of the line 3 will produce an increase in the amount of energy transmitted from the line 3 to the line 2, the machine 9 being driven as a generator by the synchronous machine 10 and the machine 5 being operated as a motor by current supplied from the machine 9. With further increases in the frequency of the line 3, the load on the machine 9 is increased and there is a tendency to restrict the amount of energy transmitted from the line 3 to the line 2 due to the fact that the flux of the winding 11 is opposed to that of the winding 12 and the flux of the winding 6 is in the same direction as that of the winding 7. As the current supplied from the machine 9 to the machine 5 increases, the electromotive forces of the machines 5 and 9 approach a condition of equality and the amount of energy transmitted from the line 3 to the line 2 is ordinarily restricted to a safe value. It will be observed that this result is accomplished without interfering with the buffer action of the converter under normal operating conditions. In order further to strengthen the buffer action, the ohmic resistance of the machines 5 and 9 is made low. While variations in the amount of energy transferred from the line 3 to the line 2 have been considered as produced by increases in the frequency of the line 3, it will be apparent that like results will follow decreases in the frequency of the line 2. This buffer action is similar when conditions are such as to transfer load in the opposite direction except that the motor generator action between machines 9 and 5 is reversed.

In my copending application, Serial No. 748,501, the adjustment of the rheostat 15 is depended upon to limit the abnormal flow of power between the lines 2 and 3 in one direction. With the present arrangement the rheostat 15 generally will have a somewhat different adjustment, namely, an adjustment which will permit the transfer of power in either direction with equal facility under ordinary variations in frequency of the two systems in either direction from normal. The auxiliary apparatus comprising machines 16, 17, 17' and 18 is now available to prevent excessive flow of power in either direction under abnormal conditions. Thus when the frequency of system 3 is high, or that of system 2 is low, there will be a transfer of power from system 3 to system 2 and an interchange of energy from machine 9 acting as a generator to machine 5 acting as a motor. If this transfer of energy becomes greater than a predetermined amount the voltage of machine 17 becomes greater than that of line 8 and current flows in field coil 23 of machine 18. Machine 18 therefore generates a voltage and produces a flow of current in field coil 13 of machine 9. The direction of this field current is now such as to oppose the field produced by coil 12 and as a consequence the voltage of machine 9 is lowered, thereby reducing the load transmitted from machine 9 to machine 5. When the transfer of power becomes above a predetermined amount in the opposite direction, namely from machine 5 to machine 9, the flow of current in the field circuits of generators 17 and 17′ is reversed and the voltage of generator 17′ becomes greater than that of line 8 and current flows in field coil 23′. This current produces a field of opposite polarity from that produced by field coil 23 and machine 18 generates a current in field coil 13 which assists the field produced by coil 12. This increases the field strength of machine 9 which is now operating as a motor and reduces the load between machines 5 and 9. When generator 17 and field 23 are active the cell 22′ prevents the flow of current in its circuit and when generator 17′ and field 23′ are active cell 22 prevents the flow of current in its circuit. In certain cases the field winding 13 may be replaced by the two field windings 23 and 23′ and the generator 18 dispensed with.

As one typical example of the operation the rheostats 15 and 20 may be adjusted so that current may flow in either direction through shunt 21 up to 1000 amperes before either generator 17 and 17′ will become active. Then at +1100 amperes in shunt 21, generator 17 produces a flow of 10 amperes in field coil 13 and at −1100 in shunt 21, generator 17′ produces a flow of 10 amperes in the opposite direction in field coil 13. The rheostat 15 is available for adjusting the direction and extent of power flow for a given frequency relation between the two systems 2 and 3 and the rheostat 20 is available for adjusting the load in either direction at which the generators 17 and 17′ become active to limit the maximum load.

In accordance with the provisions of the patent statutes I have described the principle of operation of my invention together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

1. In a power transmitting system having two independently driven, direct current machines connected in series opposition, means responsive to the direction and extent of power transferred between said machines to vary the excitation of one of said machines so as to limit the transfer of power in either direction, and means for rendering said power responsive means inactive to vary the excitation of said one machine when the power transmitted between said machines is below a predetermined amount.

2. In a power transmitting system having two independently driven, direct current machines connected in series opposition, means responsive to the flow of power in one direction between said machines for limiting said flow of power, means responsive to the flow of power in the opposite direction for limiting said flow of power, and means for rendering said power limiting means inactive when the flow of power in either direction is below predetermined amounts.

3. In a power transmitting system having two independently driven, direct current machines connected in series opposition, an exciter for one of said machines having a pair of field windings, an exciter for each of said field windings, means responsive to the direction and magnitude of the transfer of power between said direct current machines for varying the voltages of said two last mentioned exciters, means for permitting the flow of current in each of said field windings in only one direction and only after the voltage of the corresponding exciter exceeds a predetermined amount, the arrangement being such that said field windings are oppositely energized in response to the opposite directions of power flow between said direct current machines above predetermined amounts.

4. In a power transmitting system having two independently driven direct current machines connected in series opposition, an exciter for one of said machines for limiting the flow of power between said machines, said exciter having two field windings, an exciter for each field winding, a source of direct current voltage to which each of said two last mentioned exciters are connected in opposite directions, said connections including said field windings and asymmetric cells for preventing flow of power from said source to said exciters, and adjustable means for varying the voltage of said two exciters in response to the direction and magnitude of power flow between said two direct current machines.

5. In combination with two alternating current systems, means for transmitting power between said systems comprising an induction machine having its stator and rotor windings respectively connected to said two systems, a direct current machine driven with said induction machine, a direct current machine driven at a speed proportional to the frequency of the alternating current system which is connected to the rotor winding of said induction machine, said two direct current machines being connected in series opposition, a field winding on one of said machines, and means responsive to the direction and magnitude of current flowing between said two direct current machines for varying the direction and magnitude of the field current in said field winding.

6. In combination with two alternating current systems, means for transmitting power between said systems comprising an induction machine having its stator and rotor windings respectively connected to said two systems, a direct current machine driven with said induction machine, a direct current machine driven at a speed proportional to the frequency of the system to which the rotor winding of said induction machine is connected, said two direct current machines being connected in series opposition, a field winding on one of said machines, means responsive to the direction and magnitude of power flowing between said two direct current machines for varying the direction and magnitude of the field current in said field winding, and means for rendering said power responsive means inactive when the power transmitted between said direct current machines is below a predetermined amount.

7. In a power transmitting system having two independently driven direct current machines connected in series opposition, means for manually adjusting the direction and magnitude of load transfer between said machines, and automatic means responsive to the direction and the magnitude of the power transmitted between said machines above a predetermined amount for limiting such power.

8. In a power transmitting system having two independently driven direct current machines connected in series opposition, manually adjustable means for varying the excitation of one of said machines to vary the direction and magnitude of power transfer between said machines, automatic means responsive to the direction and extent of power transfers between said machines for limiting such power, and means for rendering said automatic means inactive when the power transfer is below predetermined amounts in either direction.

9. A power transmitting system comprising an induction machine having its stator and rotor windings arranged to be connected to different alternating current power systems, a dynamo electric machine driven with the rotor of said induction machine, means for operating said dynamo electric machine as a motor or as a generator for regulating the magnitude and direction of power transmitted through said induction machine, and automatic means responsive only to predetermined loads on said dynamo electric machine for limiting the amount of power transmitted through said induction machine in either direction.

In witness whereof, I have hereunto set my hand this 26th day of February, 1926.

WILHELM WEILER.